(12) United States Patent
Kallal et al.

(10) Patent No.: US 6,226,555 B1
(45) Date of Patent: May 1, 2001

(54) FLOWCHART EXCEPTION HANDLING ELEMENT

(75) Inventors: Chuck E. Kallal, Ann Arbor, CA (US); Mike W. Messick, Whitmore Lake, MI (US); Kevin P. Aretha, Saline, MI (US); Jason A. McLees, Northville, MI (US); David J. Gee, Ann Arbor, MI (US); Richard L. Mahn, Ann Arbor, MI (US); Don C. Stokes, Ann Arbor, MI (US)

(73) Assignee: Steeplechase Software, Inc., Ann Arbor, MI (US)

( * ) Notice: Subject to any disclaimer, the term of this patent is extended or adjusted under 35 U.S.C. 154(b) by 0 days.

(21) Appl. No.: 09/079,010

(22) Filed: May 14, 1998

Related U.S. Application Data
(60) Provisional application No. 60/046,503, filed on May 14, 1997.

(51) Int. Cl.[7] .................................................. G05B 11/01
(52) U.S. Cl. .................. 700/21; 700/17; 700/18; 700/83; 700/86; 700/186; 68/12.01; 68/12.05; 68/12.21; 318/434; 318/473; 318/806; 710/14
(58) Field of Search .................. 700/21, 17, 83, 700/14; 345/349; 379/10; 717/5; 68/12.01, 12.05, 12.21; 361/24, 25, 31; 318/434, 473, 806

(56) References Cited

U.S. PATENT DOCUMENTS

| | | | |
|---|---|---|---|
| 4,852,047 | * 7/1989 | Lavallee et al. | 700/89 |
| 5,355,482 | * 10/1994 | Ohhashi et al. | 700/18 |
| 5,485,620 | * 1/1996 | Sadre et al. | 717/10 |
| 5,581,759 | * 12/1996 | Ohhashi et al. | 700/18 |
| 5,613,115 | * 3/1997 | Gihl et al. | 717/1 |

OTHER PUBLICATIONS

Control Engineering online, "Software allows Combined Relay Ladder Logi Fowchart Programming" IEEE., pp. 1–2, 1997.*

Troubleshooting Guide, "SCSI Controller", IEEE., pp. 1–2, 1997.*

\* cited by examiner

*Primary Examiner*—William A. Cuchlinski, Jr.
*Assistant Examiner*—McDieunel Marc
(74) *Attorney, Agent, or Firm*—Rader, Fishman & Grauer PLLC (57) ABSTRACT

A software logic controller using flowchart programming includes exception handling elements for handling exception conditions in a manufacturing process. Exception handling is programmed using a Begin Exception element to start monitoring the occurrence of a specific exception condition and an End Exception element to stop the monitoring process. Monitoring is conducted once during every scan cycle of the computer as long as the Begin Exception element is still active.

20 Claims, 7 Drawing Sheets

Parallel branch and merge with one input to branch, and three outputs. The merge has three inputs and one output. Branch and merge have same label.

FLOWCHART EXCEPTION HANDLING ELEMENT

RELATED APPLICATIONS

This is a continuation-in-part of U.S. Patent application Ser. No. 60/046,503, entitled "FLOWCHART EXCEPTION HANDLING ELEMENTS", filed on May 14, 1997.

FIELD OF THE INVENTION

The present invention relates generally to the control of industrial equipment and processes using graphical flow charts that indicate logic flow concurrently with the execution of the underlying control program. More particularly, the invention is directed to a system for handling exception conditions in a flowchart based program.

BACKGROUND OF THE INVENTION

The vast majority of industrial processes, by definition, consist of a series of sequential or concurrent steps, each step involving one or more actions to be taken by a machine or machines. The steps may occur at specific times and in a specified sequence according to specific parameters, or may occur in response to specific events. Each step may have one or more elements, each element describing activities or operations with greater specificity.

In the past, industrial equipment was commonly controlled directly by interfacing the equipment with a programmable logic controller, or "LC". A PLC is a solid-state device designed to perform logic functions previously accomplished by electromechanical relays. The PLC uses output modules to actuate the industrial equipment in response to physical stimuli which the PLC is programmed by the operator of the system to recognize through input modules. PLCs, which still find wide use today, are usually programmed using either ladder logic or sequential function charts. Because of the cryptic nature of ladder logic, it is inherently complex and difficult and time consuming to debug and maintain.

More recently, manufacturers have sought to take advantage of the greater flexibility of general-purpose computers, including inexpensive commercially available personal computers, or "PCs", to enhance the efficiency associated with creating and maintaining software programs used to control industrial processes. Because general purpose computers can be programmed in high level commercially available languages such as BASIC, FORTRAN, C, or in object-oriented languages such as C++, manufacturers and process control vendors have been able to develop PC-based control systems that emulate traditional PLC functions, but do it in such a way that permits them to be easy to use, program and maintain, while still offering significant cost savings over dedicated PLC-based solutions.

In many instances when a PLC is used, the PLC is connected to a central control computer. In such an arrangement, the PLC plays its own dedicated role controlling the industrial process at hand while concurrently communicating information back to the central computer. By using the high level commercially available programming languages, control methods have evolved using graphical flow charts to aid the software programmer developing control programs which can emulate traditional PLC functions. Use of PCs in this way enable a manufacturer to develop and run the operator interface on the same PC and share data with other Windows™ based programs or programs based on other operating systems through dynamic data exchange. Thus, a single PC may perform the function of the programmable logic controller, the operator panel, the programming terminal, and the real time system simulator. A PC therefore can replace three separate components: PLC programming terminal, PLC processor, and operator interface. By implementing a PC-based control system, manufacturers are able to lower control system investment costs, increase productivity in design and industrial operations, and reduce down time with built in flow chart based diagnostics.

Figure 3:
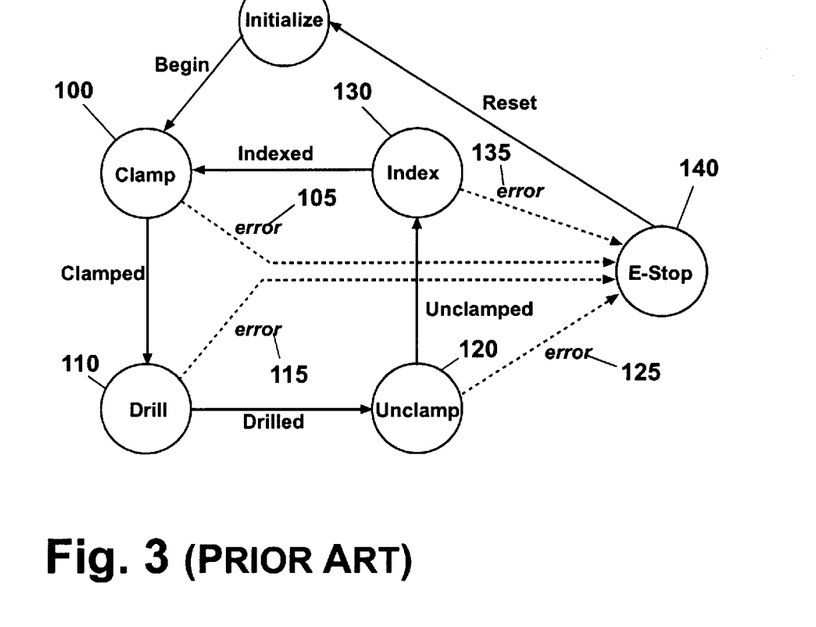
FIG. 3 is a diagram illustrating a state machine having one exception condition.

Manufacturing control systems must not only control a manufacturing process, but also handle anomalies in the process, called "exceptions". An exception occurs when an event occurs that is outside of the normal operation of the machine being controlled. For purposes of illustration, the prior art and the present invention will be described as being applied to a clamping and drilling operation. Those of skill in the art, however, will understand that manufacturing control systems can be used in many diverse applications. FIG. 3 is an example of a state machine with one exception condition. The process shown in FIG. 3 has four states 100, 110, 120 and 130, each state having one corresponding exit condition, or exception, 105, 115, 125, 135 where all of the conditions result in the same action 140 (an E-stop, in this example). As shown in FIG. 3, during normal operation, a piece to be worked is first clamped into place and then drilled. After drilling takes place, the piece is unclamped and after indexing the process cycle begins again with the next piece. If an error occurs at any step in the process, such as a jam in the machine being controlled, a separate sequence of operations is usually carried out to correct the error. Once the exception is fixed, the process cycle can be restarted. As can be seen in FIG. 3, even with a simple manufacturing process having only one exception exit per step and only one resulting action, a flowchart programmer has to individually program each of these conditions and connect the exception exit condition for each step to the same E-stop action. This type of programming can be quite burdensome. As the number of possible exception types and actions increase for each manufacturing step, the complexity of the program can increase exponentially, making the logic redundant and tedious to program.

The complexity of the program is mainly caused by the fact that each state must have at least one and possibly many exits to another state to address events that are out of the ordinary. At this point, the machine goes to a state where it handles the exception to normal operations. In other words, the normal program would cycle a particular group of steps repeatedly and if something wrong happens, then the program would go to an exception handling state which includes exiting the normal state mode. The condition causing the exception would then be repaired, allowing the program to return to the normal state process flow.

A decision diamond must be implemented at any point where special action is desired after an exception is detected. The exception handling becomes even more complicated if the decision takes place in a sub-routine. This is because the sub-routine may itself include parallel branches, causing multiple program threads to be executing when a particular exception occurs. The exception handling code will then have to eventually pull the multiple threads back to one common step, generating a great amount of extra work if the normal operation has branched into many different threads.

It is therefore an object of the invention to minimize program redundancy arising from individually programming multiple exception exit conditions for each state in a manufacturing control process.

It is yet another object of the invention to allow the exception handler to function regardless of the number of sub-program levels that have been called or the number of parallel threads being processed when an exception is detected.

SUMMARY OF THE INVENTION

The present invention is directed to an exception handler in a flowchart programmed software logic controller. In the invention, exception handling elements, such as a "Begin Exception" and "End Exception" element, are paired together, and corresponding elements have matching labels. Each error condition has exactly one Begin Exception element and zero or more associated End Exception elements. In a preferred embodiment, the Begin Exception elements will have an associated Boolean expression that is evaluated during every scan cycle of the logical controller. If the expression indicates that an exception condition exists, all program threads initiated after the Begin Exception element are terminated, including any threads created via parallel branches and regardless of any nested subroutines. The controller then may begin execution of an exception program that is connected to the Begin Exception element. Note that any element that occurs after defining an error condition using the exception elements is subject to be halted by that error condition. Regardless of whether the program is executing normally or during an exception, the Boolean expression associated with a particular Begin Exception element is evaluated every scan cycle of the controller until its corresponding End Exception element is reached or until the condition associated with the particular Begin Exception element is otherwise terminated. For example, an End Exception element for a main routine (an "outer nested exception") containing several subroutines will terminate all End Exception elements for the subroutines therein as well as for the main routine.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
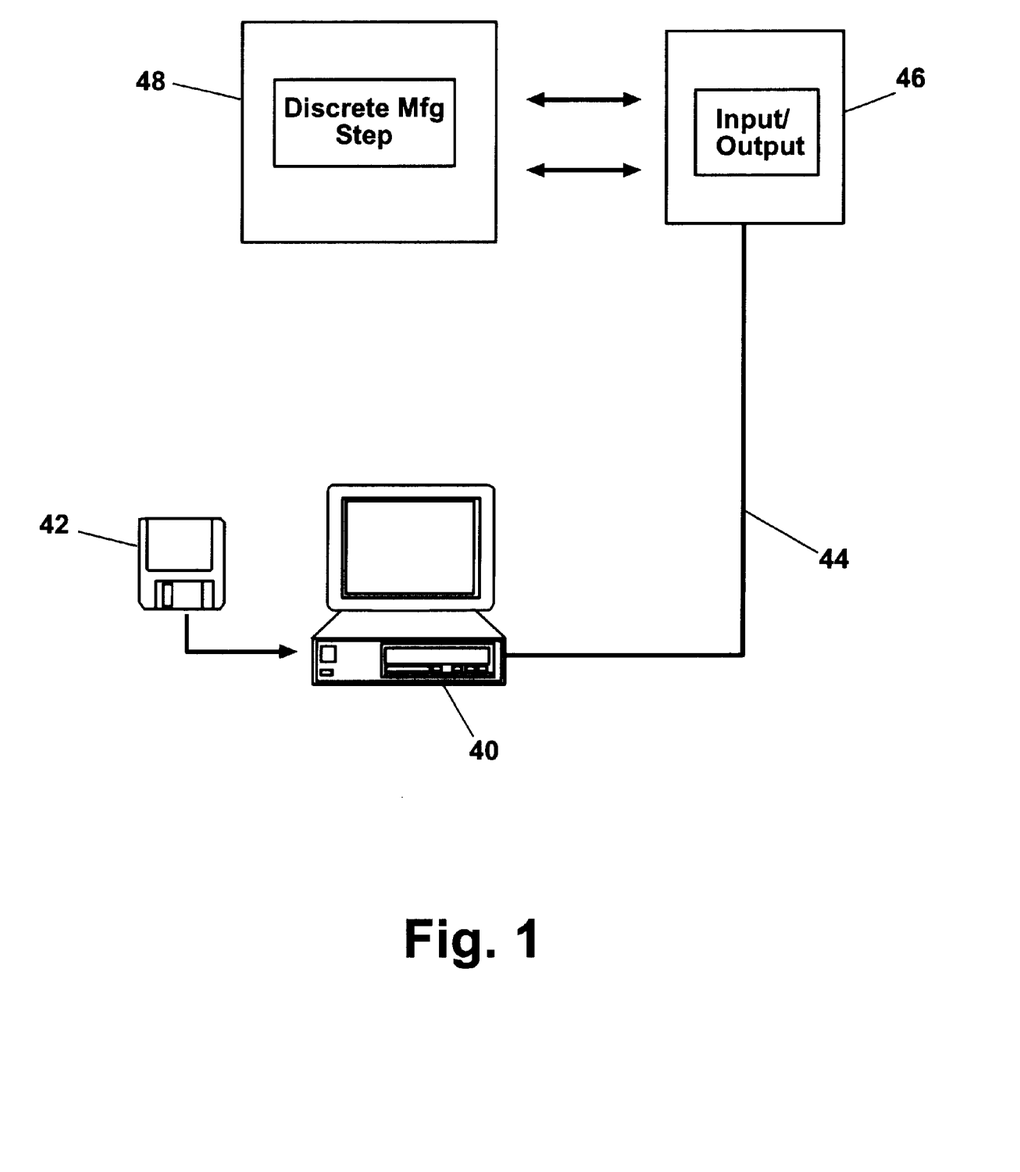
FIG. 1 is a diagrammatic block view of the hardware used in the present invention.

Now referring to FIG. 1, the control program hardware apparatus includes a digital computer 40 and controlling program software embodied on floppy disk 42. In a typical hardware arrangement, computer 40 is connected 44 to input/output device 46. Input/output device 46 is controlled via the control program software 42 and interacts with a discrete industrial step 48 which is a subpart of a industrial process. Each discrete industrial step 48 occurs at a predetermined time, or in response to a predetermined parameter, which is either supplied by or measured by input/output device 46, or both. Input/output device 46 thus provides the external stimuli to digital computer 40, in response to which the control program may cause other industrial events to occur.

Figure 2:
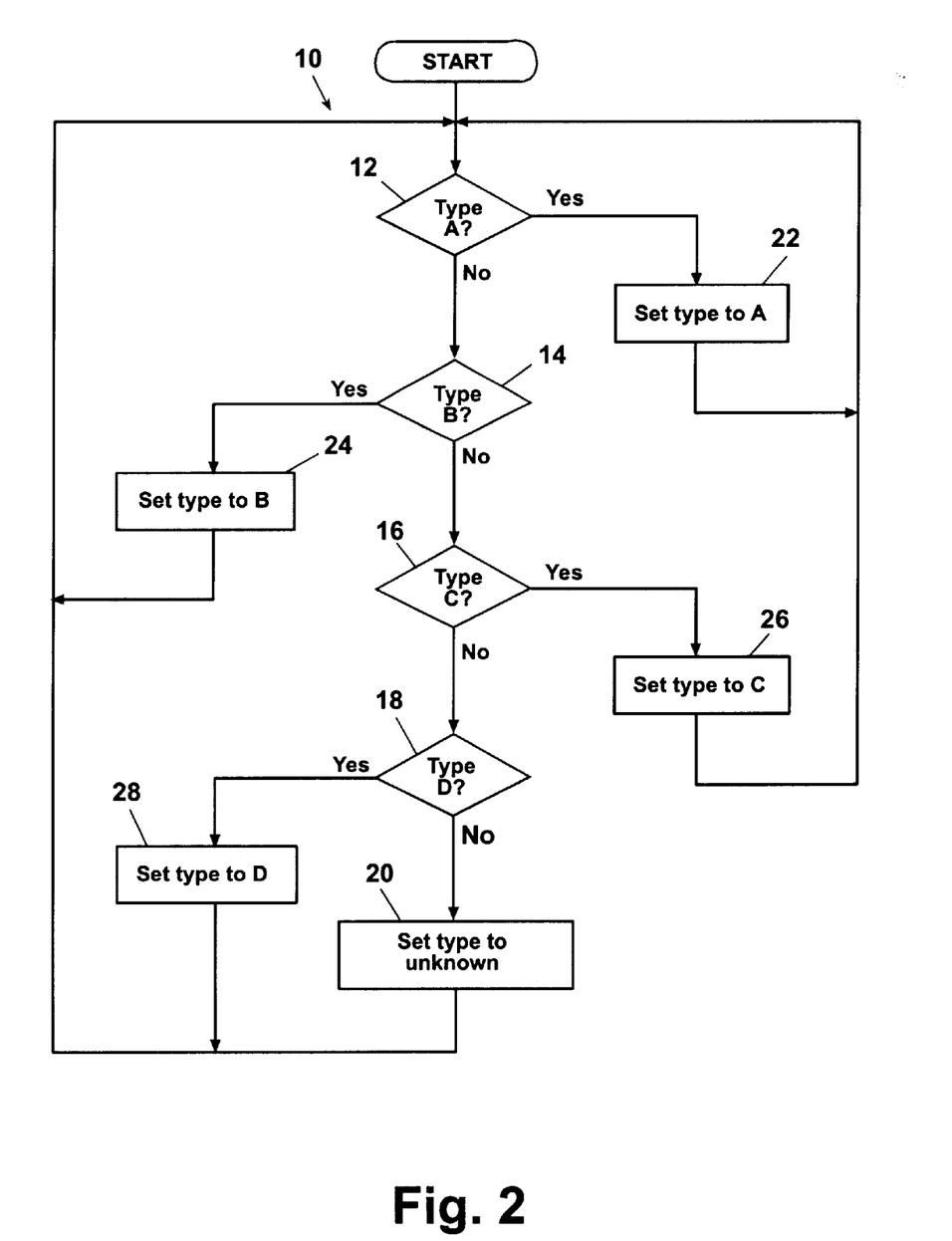
FIG. 2 is an example of a flow chart in a typical control application as depicted through known graphical flow chart technology.

Using known methods and commercially available control program software packages, an applications engineer may construct a control program for an industrial application. Some commercially available software packages allow for a control program to be constructed only in graphical flow chart form. However, any control program is capable of being described through the use of a flow chart, such as chart 10 shown in FIG. 2. In a simple demonstrative program depicted by flow chart 10 in FIG. 2, a continuous loop program initiates from the terminal point labeled start. Several decision points 12, 14, 16 and 18 are serially arranged within the program. Each decision point 12, 14, 16 and 18 determines which of the many possible alternative paths to follow. According to chart 10, a "no" answer at a decision operator results in the process passing to the next decision operator. Alternatively, a "yes" response to a decision operation results in a path to a processing function 20, 22, 24, 26 or 28. Upon completion of a processing function 20, 22, 24, 26 or 28, the program described in chart 10 returns to the first decision operator 12 and executes once more.

Since every control program may be represented with a flow chart, a programmer can use a commercially available graphical flow chart software package to program a digital computer to control an industrial step. In operation, a graphical flow chart is developed to control input/output devices directly from the PC according to accepted methods. The graphical flow chart is displayed upon a visual screen attached to the digital computer upon which the control program is in operation. As explained above, however, conventional graphical flow chart programs do have some limitations when creating ways to handle exceptions in the manufacturing process, primarily due to the tedious and redundant nature of the program as shown in FIG. 3. The invention, however, simplifies normal graphical flow chart programming by eliminating the redundant programming through specialized exception handling elements in the flowchart.

Figure 4A:
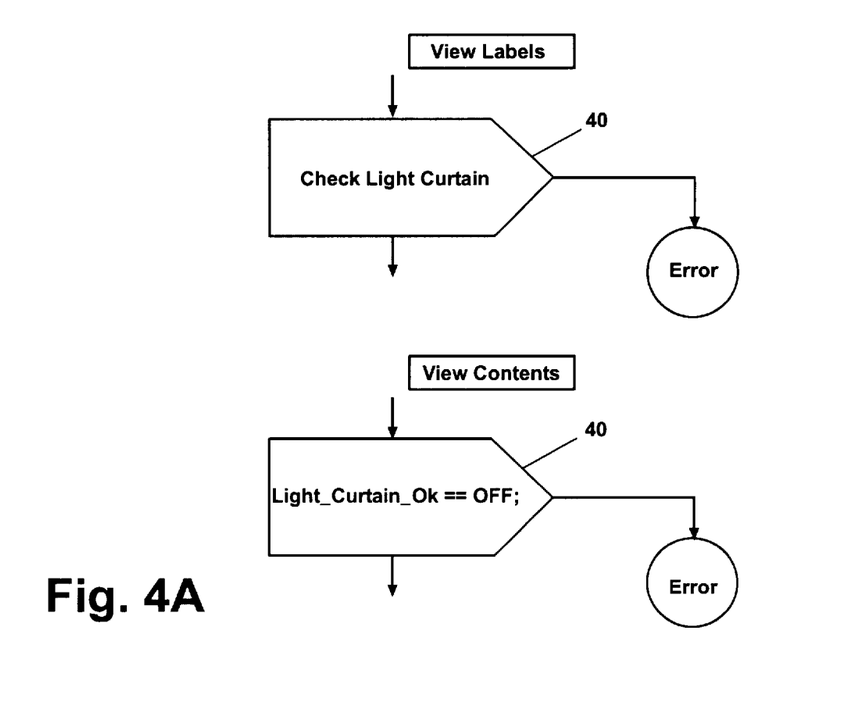
FIGS. 4a and 4b show symbols representing the Begin and End Exception handling elements of the present invention.
Figure 4B:
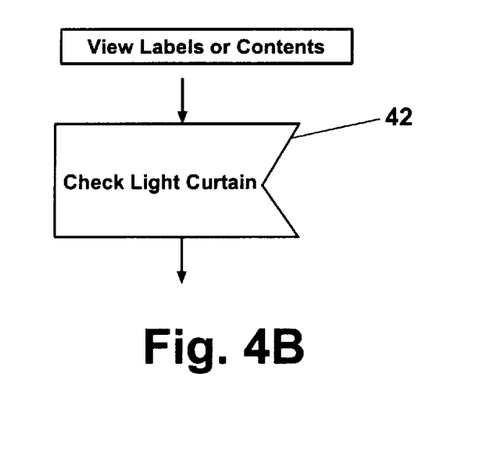

The following description will use a "light curtain check" as an example of a manufacturing step being evaluated for exceptions. Many manufacturing applications use a light curtain as a safety measure to ensure that an operator's hands are safely away from moving parts before a piece is worked. Those of ordinary skill will recognize, however, that the invention can be used in any process. FIG. 4a illustrates a "Begin Exception" element 40, and FIG. 4b illustrates an "End Exception" element 42. The "Begin Exception" element 40 is inserted into the flowchart at any point where the programmer wishes the controller to begin watching for an exception condition, and its corresponding "End Exception" element 42 is placed to end the watch for the exception condition. The Begin and End Exception elements 40 and 42 are placed in corresponding pairs, each pair representing a particular exception condition to be watched. When multiple pairs are used, corresponding Begin and End Exception elements 40 and 42 have identical label names, such as "Check Light Curtain" as shown in the figures.

Figure 5A:
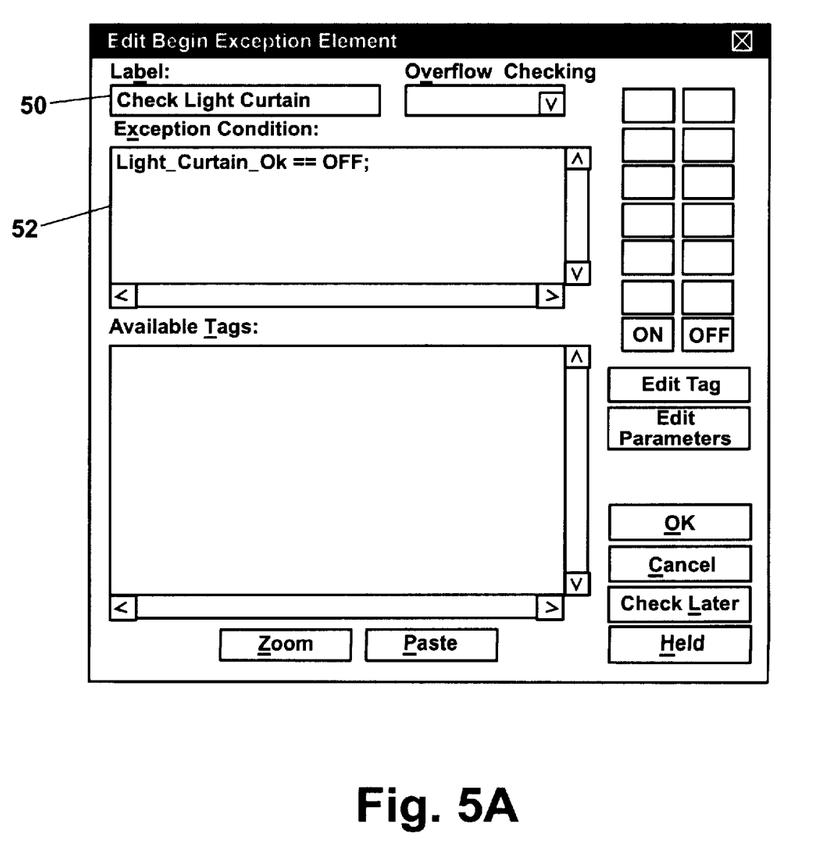
FIGS. 5a and 5b is a diagram of possible user interface screens for defining and editing exception handling element characteristics.
Figure 5B:
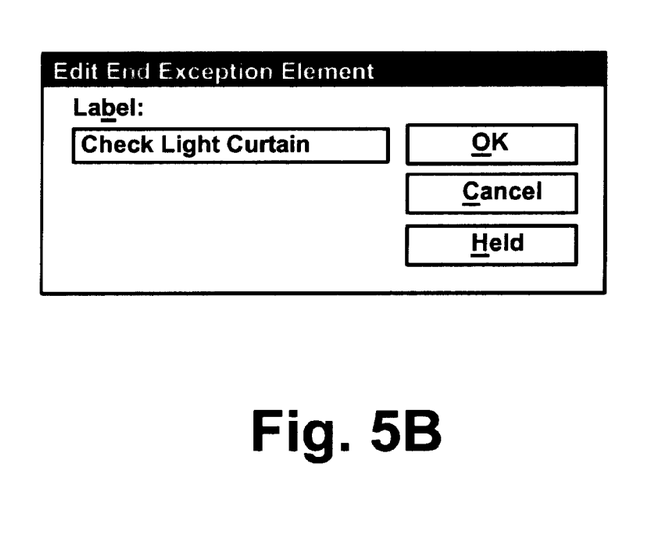

The Begin and End Exception elements are defined by the programmer through a user interface, such as that shown in FIGS. 5a and 5b. When defining the Begin Exception element 40, the programmer first labels 50 the element 40. The label 50 is used to match corresponding Begin and End Exception elements and also provides a clear description of the exception condition being monitored. Next, the programmer can specifically define the exception condition to be watched 52 using a Boolean expression. In this example, the Boolean expression for monitoring the light curtain is Light_Curtain_OK==OFF to indicate that the manufacturing process is normal as long as the expression is false (e.g. Light_Curtain_OK==ON, indicating that the light curtain is unbroken). If the Boolean expression is false, then the flow execution of the manufacturing process continues normally, but the Boolean expression will still be checked during each scan cycle.

The checking process terminates when the program encounters an End Exception element corresponding with the particular Begin Exception element. To define a corresponding End Exception element, the programmer only needs to enter the label 50 of the exception element he wishes to end 42, such as in the user interface shown in FIG. 5b. In this example, the End Exception element is labeled "Check Light Curtain" to correspond with the Begin Exception element "Check Light Curtain". The corresponding End Exception element can then be placed into the flowchart program. The programmer selects the location of the End Exception element by determining the point in the manufacturing process at which the exception condition being monitored is no longer applicable. Once the flowchart encounters a Begin Exception element, the exception condition is monitored during each scan cycle of the controller until it is terminated by the execution of its corresponding End Exception element 42 or, in a more complex program, by other events, which will be explained below.

If an exception condition occurs at any point in the flowchart between the Begin and End Exception elements, such as a broken light curtain caused by someone's hand entering through it, the Boolean equation associated with the "Check Light Curtain" exception element will be true at the next scan cycle. At this point, normal execution of the flowchart stops and control continues out an exception exit even though the exception exit was not explicitly programmed at the step at which the light curtain was broken. This is because the Boolean equation evaluating the condition of the light curtain is still active and the breaking of the light curtain changes the Boolean equation from being false to being true, triggering the exception exit at the next scan cycle. Because the Begin Exception element 40 already triggers monitoring of the exception condition for everything in the flowchart that follows the element 40, the program can pull out of the normal manufacturing process and deal with the exception without requiring the programmer to explicitly program the exception exit at each step at which the exception could possibly occur. Instead, the programmer only has to determine when monitoring of any given exception should start and stop, greatly simplifying the overall flowchart program.

Although the example described above only addresses a flowchart having only one exception element pair, the invention allows multiple conditions to be watched simultaneously by programming parallel flow charts or nesting multiple exception pairs.

Figure 6A:
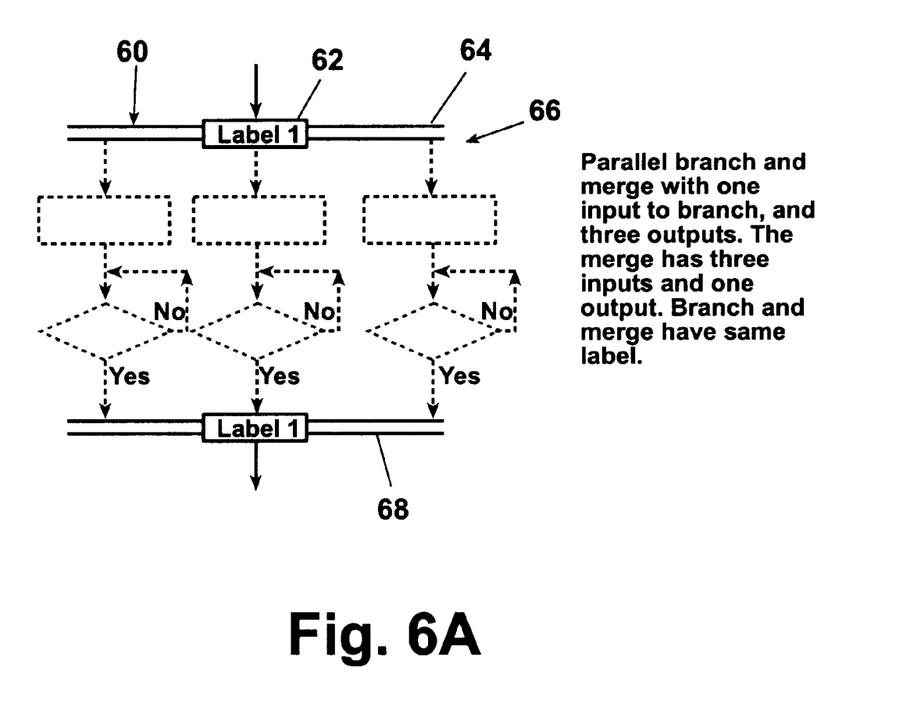
FIGS. 6a through 6f illustrate domain rules used for programming flowcharts.
Figure 6B:
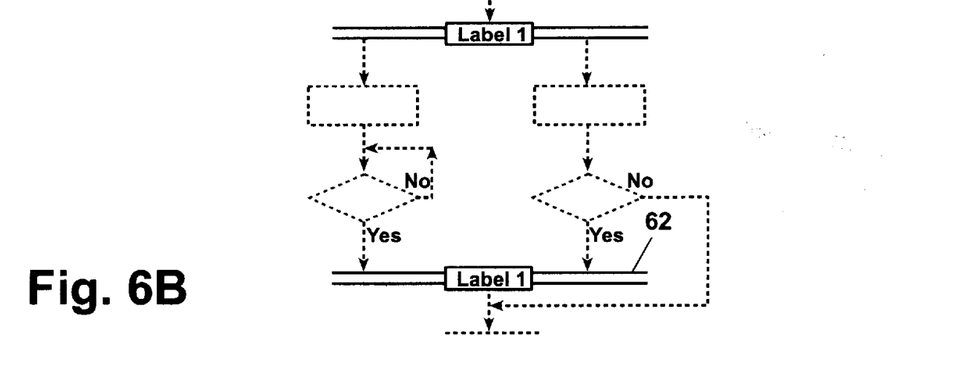
Figure 6C:
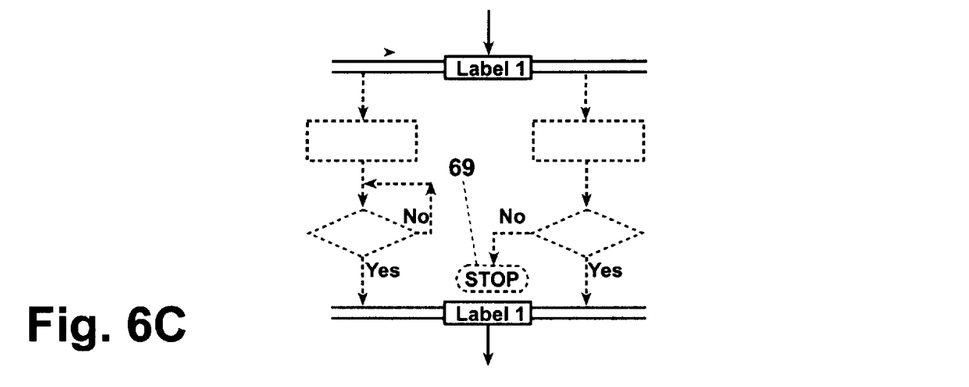
Figure 6D:
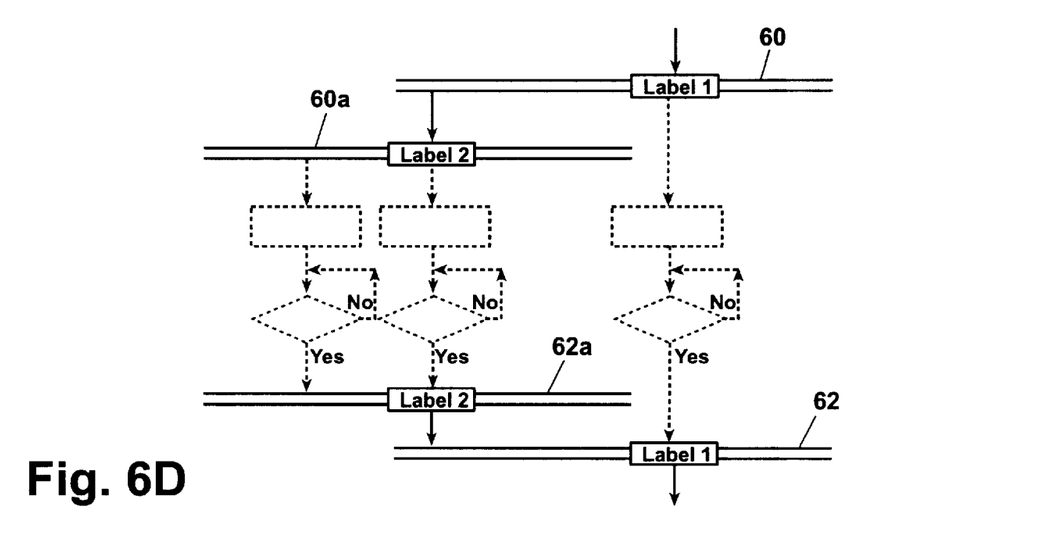
Figure 6E:
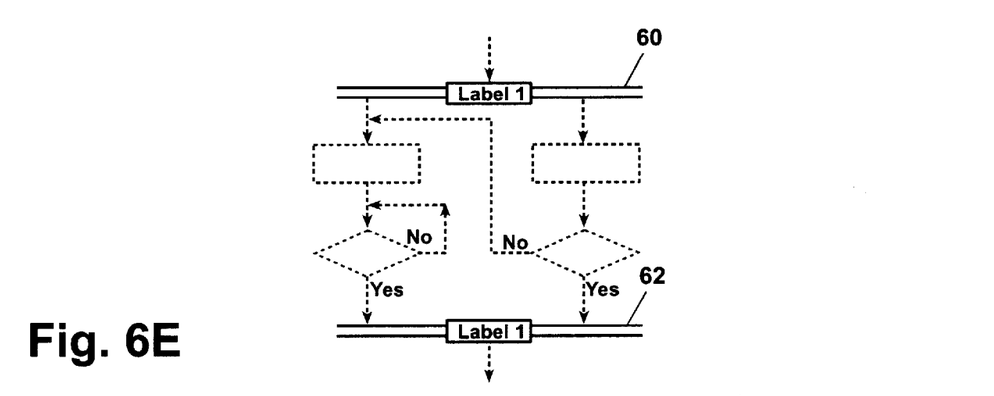
Figure 6F:
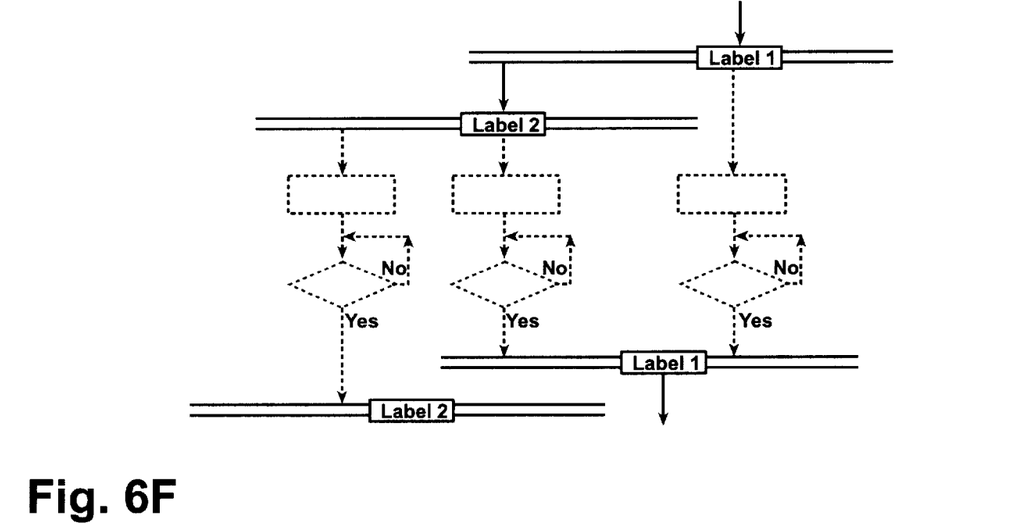

Turning to FIGS. 6a through 6f, more complex flowchart programs can be programmed using parallel flow charts, or parallel "threads" 60, 62, 64, as shown in FIG. 6a. Because parallel flow charts start and stop at common areas, this is also called a parallel branch and merge. For every parallel branch element 66 having a particular label, there must also be a corresponding parallel merge element 68 with the same label. All flows coming from the parallel branch element 66 must terminate at the corresponding parallel merge element 68. Further, all branch flows 60, 62, 64 must reach the merge element 68 before execution can continue beyond the merge element 68. When a parallel branch is encountered, all of the branches are executed during the same scan cycle.

The rules for programming using parallel branches and merges are as follows:
1. All flows beginning in a parallel branch element 60 must terminate at the corresponding parallel merge element 68 (FIG. 6a).
2. Flows cannot jump around the merge element 62 (FIG. 6b).
3. Flows cannot encounter a stop element 69 inside a branch merge pair (FIG. 6c).
4. Flows cannot merge or overlap each other inside a branch merge pair (FIG. 6e).
5. A parallel branch merge (60a, 62a) can be nested within another parallel branch merge (60, 62) (FIG. 6d).
6. The inner branch of a parallel branch and merge cannot span an outer branch's merge (FIG. 6f).
7. Execution order is conducted left to right according to the flow arrows leaving the parallel branch element. However, selected exception conditions can be prioritized such that one exception exit condition is executed first. For example, if the light curtain is broken, the system will normally take the light curtain exit, but regardless of the condition of the light curtain, if the E-stop button is broken, the E-stop exit is taken. In other words, in this example, the E-stop has higher priority over the light curtain exit.
8. Execution threads cannot be spontaneously created or deleted. In other words, an item from one executing thread cannot be attached to another executing thread during execution of the flowchart program.

Figure 7:
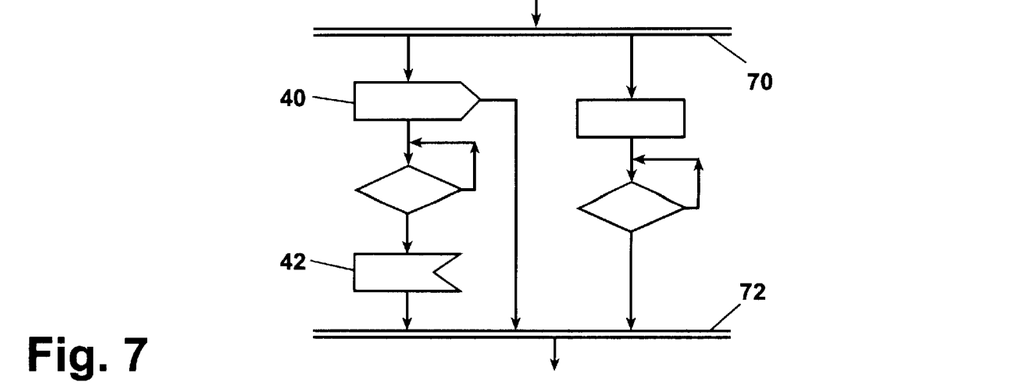
FIG. 7 is a sample flowchart incorporating the Begin and End Exception handling elements of the invention.

All of these domain rules apply when programming using the Begin and End Exception elements 40 and 42. Further, if a Begin Exception element 40 is placed inside a parallel branch merge pair 70 and 72, then the corresponding End Exception element 42 must also be placed inside the same parallel branch merge pair, as illustrated in FIG. 7. Also, the End Exception path 42 must ultimately end at the merge element 72.

Once a Begin Exception element 40 is encountered in the flowchart program, the corresponding exception condition is monitored during every scan cycle of the controller until the Begin Exception element 40 is terminated by (1) reaching a matching End Exception element or (2) taking an exception path when the exception condition occurs, either for this particular exception or for an outer nested exception. Note that the exception exits in the invention do not occur the very instant a condition becomes true, but instead the exits occur when, at the beginning of a scan, the condition is true. If later in the scan, an event occurs causing one of the exceptions to be true, the process will not go back and re-evaluate the exceptions until the next scan time. This avoids requiring exception exits to be defined at each step in the manufacturing process.

Using the invention, the programmer may achieve faster software implementation than that currently afforded by existing PLC technology or existing graphical user interface programming tools. An added advantage is that the program resulting from the invention is much simpler to understand and debug.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A system for handling exceptions in a process controlled by a flowchart programmed software logic controller, the system comprising:

means for receiving parameters relating to an exception condition in the process;

means for beginning an exception condition monitoring state for detecting the occurrence of the exception condition based on the parameters received by the receiving means;

an exception exit associated with the beginning means, wherein the exception exit is executed if the exception condition is detected;

means for ending the exception condition monitoring state, wherein the ending means corresponds to the beginning means.

2. The system of claim 1, wherein the parameters received by the receiving means include a Boolean expression that becomes true when the exception condition occurs in the process.

3. The system of claim 1, wherein each beginning means has an associated ending means such that there is a one-to-one relationship between said beginning means and said ending means.

4. The system of claim 1, wherein the system contains a plurality of exception exits associated with the beginning means.

5. The system of claim 1, wherein the occurrence of the exception condition is monitored during the exception condition monitoring state once during every scan cycle of the system.

6. The system of claim 1, wherein the system contains a plurality of beginning means and a plurality of ending means, wherein each beginning means and each ending means correspond to each other in a one-to-one relationship.

7. The system of claim 1, wherein the system contains a plurality of ending means associated with one beginning means.

8. A method for handling exceptions in a process controlled by a flowchart programmed software logic controller, the method comprising:

receiving parameters relating to an exception condition in the process;

beginning an exception condition monitoring state for detecting the occurrence of the exception condition based on the parameters received by the receiving means;

defining an exception exit associated with the beginning means, wherein the exception exit is executed if the exception condition is detected;

ending the exception condition monitoring state, wherein the ending means corresponds to the beginning means.

9. The method of claim 8, wherein the parameters received in the receiving step include a Boolean expression that becomes true when the exception condition occurs in the process.

10. The method of claim 8, wherein each beginning means has an associated ending means such that there is a one-to-one relationship between said beginning means and said ending means.

11. The method of claim 8, wherein the method includes defining a plurality of exception exits associated with the beginning step.

12. The method of claim 8, wherein the beginning step comprises monitoring the occurrence of the exception condition during the exception condition monitoring state once during every scan cycle.

13. The method of claim 8, wherein the method includes contains a plurality of beginning steps and a plurality of ending steps, wherein each beginning step and each ending step correspond to each other in a one-to-one relationship.

14. The method of claim 8, wherein the method contains a plurality of ending steps associated with one beginning step.

15. A computer implemented software system used for handling exceptions in a process controlled by a flowchart programmed software logic controller, comprising the steps of:

receiving parameters relating to an exception condition in the process;

beginning an exception condition monitoring state for detecting the occurrence of the exception condition based on the parameters received by the receiving means;

defining an exception exit associated with the beginning means, wherein the exception exit is executed if the exception condition is detected;

ending the exception condition monitoring state, wherein the ending means corresponds to the beginning means.

16. The software system of claim 15, wherein the parameters received in the receiving step include a Boolean expression that becomes true when the exception condition occurs in the process.

17. The software system of claim 15, wherein the beginning step comprises monitoring the occurrence of the exception condition during the exception condition monitoring state once during every scan cycle.

18. A computer readable storage device containing software used to control a flowchart programmed software logic controller, the software comprising the steps of:

receiving parameters relating to an exception condition in the process;

beginning an exception condition monitoring state for detecting the occurrence of the exception condition based on the parameters received by the receiving means;

defining an exception exit associated with the beginning means, wherein the exception exit is executed if the exception condition is detected;

ending the exception condition monitoring state, wherein the ending means corresponds to the beginning means.

19. The storage device of claim 18, wherein the parameters received in the receiving step include a Boolean expression that becomes true when the exception condition occurs in the process.

20. The storage device of claim 18, wherein the beginning step comprises monitoring the occurrence of the exception condition during the exception condition monitoring state once during every scan cycle.

* * * * *